United States Patent
Kumar et al.

(10) Patent No.: US 11,909,495 B2
(45) Date of Patent: Feb. 20, 2024

(54) CODEBOOK ADJUSTMENT OR BEAM SWITCHING BASED ON INTERNAL INTERFERENCE TO A SENSOR OR INTERFACE OF A UE

(71) Applicant: QUALCOMM Incorporated, San Diego, CA (US)

(72) Inventors: Akash Kumar, Hyderabad (IN); Dharmendra Kumar Prasad, Hyderabad (IN)

(73) Assignee: QUALCOMM Incorporated, San Diego, CA (US)

(*) Notice: Subject to any disclaimer, the term of this patent is extended or adjusted under 35 U.S.C. 154(b) by 206 days.

(21) Appl. No.: 16/661,853

(22) Filed: Oct. 23, 2019

(65) Prior Publication Data
US 2021/0126697 A1    Apr. 29, 2021

(51) Int. Cl.
H04B 7/08      (2006.01)
H04W 16/28     (2009.01)
H04W 24/02     (2009.01)

(52) U.S. Cl.
CPC ............ *H04B 7/088* (2013.01); *H04W 16/28* (2013.01); *H04W 24/02* (2013.01)

(58) Field of Classification Search
CPC ... H04W 24/10; H04W 72/082; H04W 16/28; H04W 52/241; H04W 72/085; H04W 72/046; H04W 24/02; H04W 52/10
See application file for complete search history.

(56) References Cited

U.S. PATENT DOCUMENTS

| | | | |
|---|---|---|---|
| 2015/0072627 A1* | 3/2015 | Balasubramanian | H04B 15/02 455/77 |
| 2015/0139150 A1 | 5/2015 | Ng | |
| 2017/0064531 A1* | 3/2017 | Stephenne | G06K 9/00785 |
| 2018/0199220 A1 | 7/2018 | Reial et al. | |
| 2018/0213324 A1* | 7/2018 | De Milleri | H04R 3/04 |
| 2018/0278309 A1 | 9/2018 | Raghavan et al. | |
| 2019/0074854 A1 | 3/2019 | Raghavan et al. | |
| 2019/0150013 A1* | 5/2019 | Zhang | H04W 72/042 375/224 |

(Continued)

FOREIGN PATENT DOCUMENTS

| | | |
|---|---|---|
| CN | 108063646 A | 5/2018 |
| CN | 108512625 A | 9/2018 |
| CN | 109348013 A | 2/2019 |

(Continued)

OTHER PUBLICATIONS

International Search Report and Written Opinion—PCT/US2020/053985—ISA/EPO—dated Feb. 22, 2021.

*Primary Examiner* — Kwasi Karikari
(74) *Attorney, Agent, or Firm* — Procopio, Cory, Hargreaves & Savitch LLP

(57) ABSTRACT

A UE may determine use of a sensor or an interface of the UE, and in response, may adjust at least one of a beam selection, a transmission power, an operation mode, or a performance of carrier aggregation for the UE. A base station may receive an indication from the UE that a carrier for which the UE is configured has an effect on performance of a sensor or an interface of the UE. The base station may adjust a configuration of the carrier or adjusting uplink grants for the carrier in response to receiving the indication from the UE.

42 Claims, 11 Drawing Sheets

(56) References Cited

U.S. PATENT DOCUMENTS

2019/0200337 A1    6/2019  Zhou et al.
2020/0076488 A1*   3/2020  Brunel ................. H04B 7/0695

FOREIGN PATENT DOCUMENTS

| CN | 109413637 A | 3/2019 |
| CN | 109639368 A | 4/2019 |
| WO | 2018064327 A1 | 4/2018 |

* cited by examiner

CODEBOOK ADJUSTMENT OR BEAM SWITCHING BASED ON INTERNAL INTERFERENCE TO A SENSOR OR INTERFACE OF A UE

BACKGROUND

Technical Field

The present disclosure relates generally to communication systems, and more particularly, to wireless communication involving a user equipment (UE).

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication at a user equipment (UE). The apparatus determines use of a sensor or an interface of the UE. In response to determining the use of the sensor or the interface, the apparatus adjusts at least one of beam selection, transmission power, an operation mode, or performance of carrier aggregation for the UE.

In an aspect of the disclosure, a method, a computer-readable medium, and an apparatus are provided for wireless communication at a base station. The apparatus configures a UE for carrier aggregation. The apparatus receives an indication from the UE that a carrier for which the UE is configured has an effect on performance of a sensor or an interface of the UE. The apparatus adjusts a configuration of the carrier or adjusts uplink grants for the carrier in response to receiving the indication from the UE.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
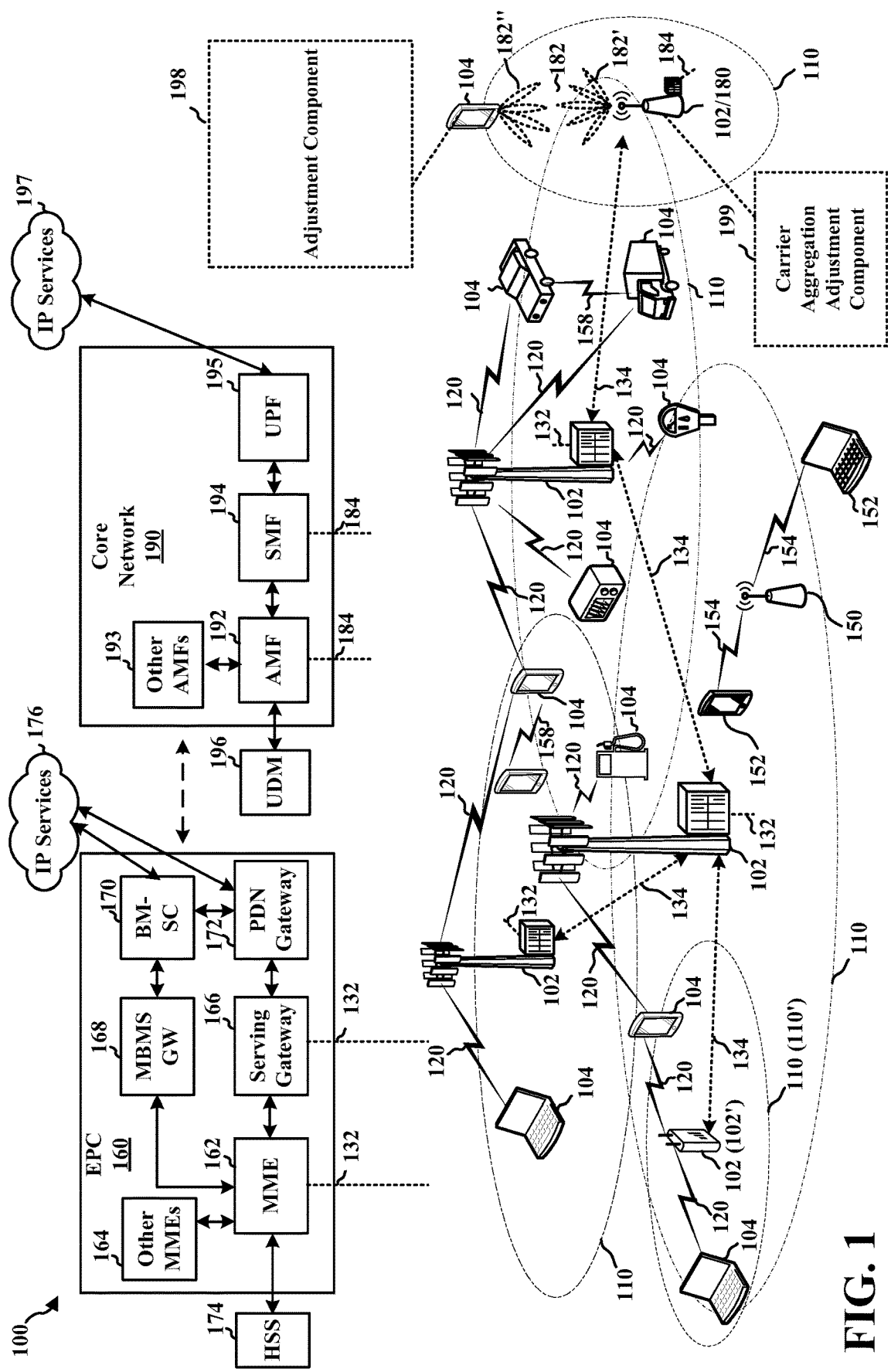
FIG. 1 is a diagram illustrating an example of a wireless communications system and an access network in accordance with aspects presented herein.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, a computer program may comprise program instructions which are computer-executable to implement all steps of a method associated with the methods, functions or other elements described throughout this disclosure. The functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to YMHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station. Some base stations 180, such as a gNB, may operate in a traditional sub 6 GHz spectrum, in millimeter wave (mmW) frequencies, and/or near mmW frequencies in communication with the UE 104. When the gNB operates in mmW or near mmW frequencies, the gNB may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station, such as base station 180, may utilize beamforming 182 with the UE 104 to compensate for the extremely high path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in some aspects, the UE 104 may include an adjustment component 198 configured to determine use of a sensor or an interface of the UE, and in response, to adjust at least one of a beam selection, a transmission power, an operation mode, or a performance of carrier aggregation for the UE. In some aspects, in addition or as an alternative, UE 104 may include an adjustment component 198 or other means to determine use of a sensor or an interface of the UE, and in response, to send an indication to a base station (such as base station 102/180) indicating that a carrier that the UE uses for the carrier aggregation has an effect on the sensor or the interface of the UE. As an example, the indication is sent in at least one of a UE assistance information message or an inter-device co-existence message. Optionally, the UE (such as UE 104) is configured to receive an adjusted configuration for the carrier or reduced uplink grants for the carrier in response to the indication sent to the base station. In some aspects, base station 102/180 may include a carrier aggregation adjustment component 199 configured to receive an indication from the UE 104 that a carrier for which the UE is configured has an effect on performance of a sensor or an interface of the UE and to adjust a configuration of the carrier or adjusting uplink grants for the carrier in response to receiving the indication from the UE. Although the following description may be focused on 5G NR, the concepts described herein may be applicable to other similar areas, such as LTE, LTE-A, CDMA, GSM, and other wireless technologies.

Figure 2:
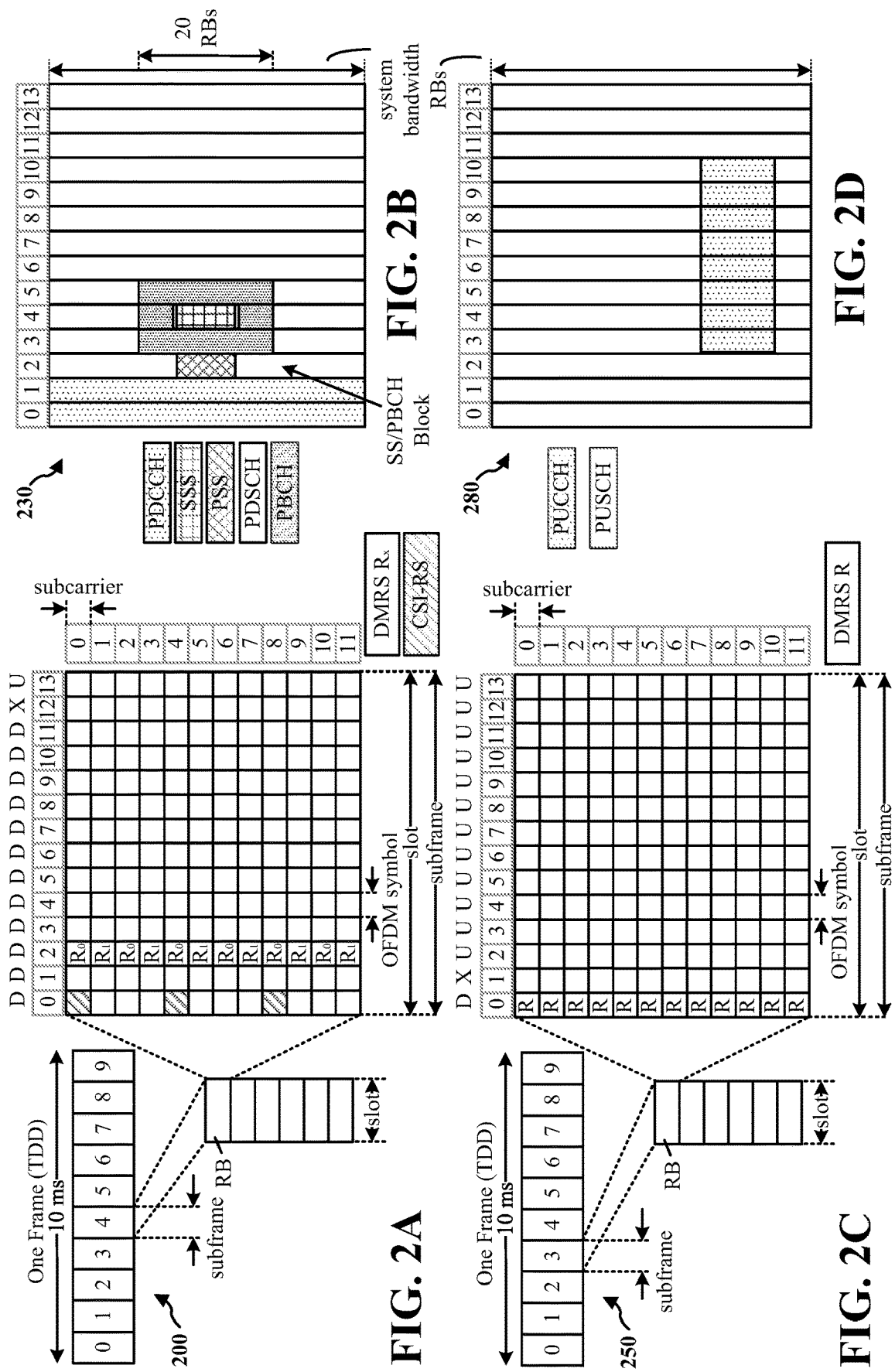
FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu*15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=0 with 1 slot per subframe. The subcarrier spacing is 15 kHz and symbol duration is approximately 66.7 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
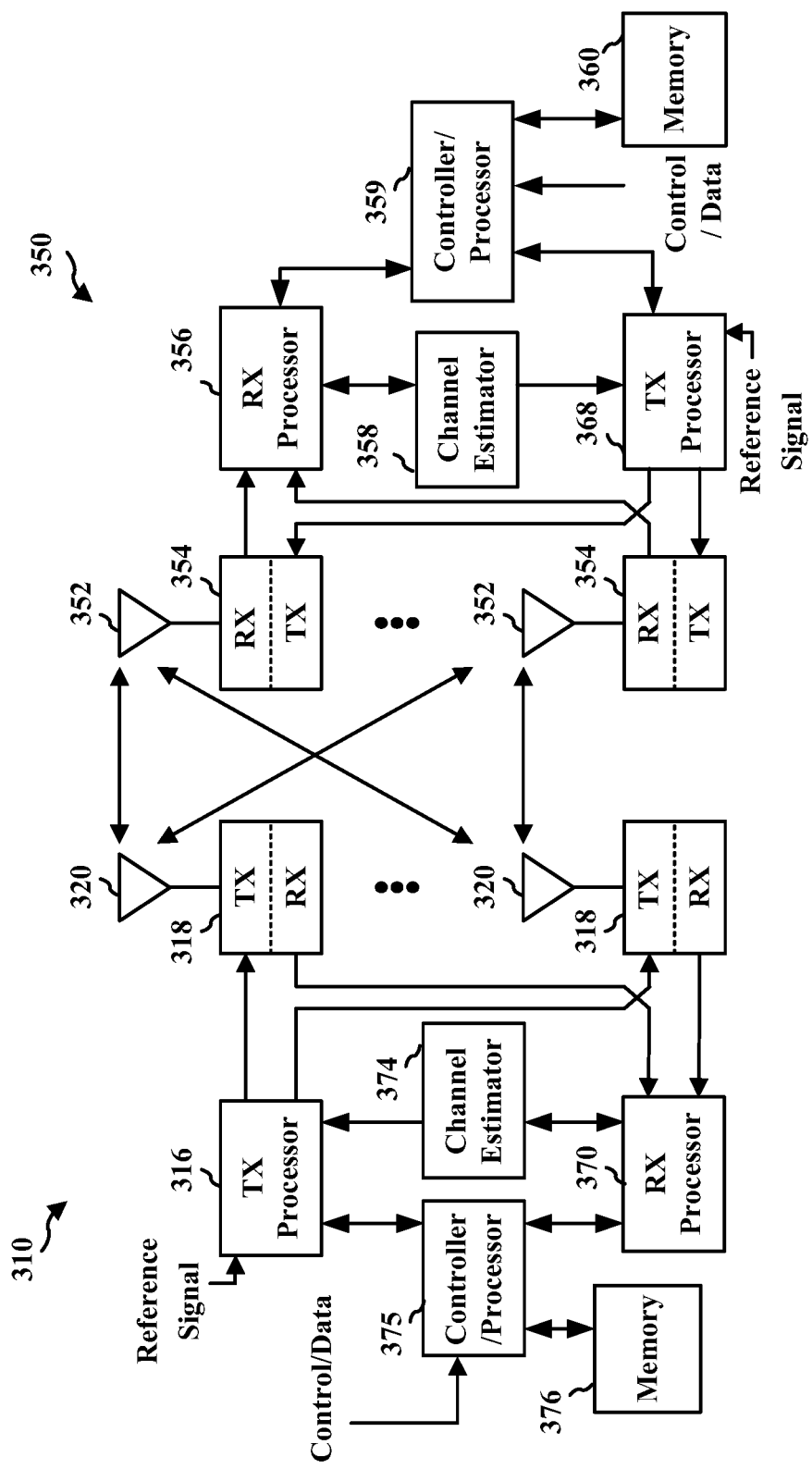
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1. At least one of the TX processor 316, the RX processor 370, and the controller/processor 375 may be configured to perform aspects in connection with 199 of FIG. 1.

As described in connection with FIG. 1, a UE 104 may transmit and receive communication with as base station 180 using beamformed signals from the base station 180. As an example, narrow beam directions may be used for mmW communication. The beams may be formed using multiple antenna elements, which receive input from phase shifters and amplifiers to form a desired beam. A codebook may be used to determine an amplitude and phase for each of the antenna elements. In an example, beams may be selected based on selecting or switching between different beam steering vectors. In some examples, the beam steering vectors may include different scaling factors for the respective amplitudes assigned to the antenna elements. Beams may be selected or switched based on beam training. Beam switching may be based on external sensors such as proximity sensors or thermal sensors to limit human exposure to Radio Frequency (RF) radiation from wireless devices and/ or for thermal mitigation. Additionally or alternatively, beam switching may be based on mobility of the UE, e.g., based on input from accelerometers, gyroscopes, and magnometers that may indicate a UE rotation or a straight line motion of the UE. RF beam switching may be performed so that a radio frequency integrated circuit (RFIC) may settle within 100-200 ns, e.g., within a CP window of a symbol. In some implementations, components of the UE that adjust a beam or phase may include circuits comprising dedicated hardware and/or signal processors to carry out beam switching utilizing digital baseband signal processing. Moreover, mixed-signal circuits for converting digital signals to analog signals, and further, RF mixers to convert the baseband signals to radio frequency may be applied. An exact implementation of the UE component(s) in hardware/software, a baseband/RF split and/or a digital/analog split, respectively, may depend upon the particular application and design constraints imposed on the overall system.

The antenna elements of the UE that are used to generate the beamformed signal may radiate interference that causes internal interference to components of the UE. For example, some antenna elements may cause interference to a camera or to a Mobile Industry Processor Interface (MIPI) line carrying camera data from a camera sensor to an image signal processor (ISP). This interference from the antenna elements may cause image degradation and may affect both still images and images in a video mode. FIG. 4A illustrates an example UE 401 comprising a camera 402 connected to a mainboard 406 via a flexible printed circuit (FPC) 404. The FPC 404 may comprise a Mobile Industry Processor Interface (MIPI) line carrying camera data from a camera sensor, e.g., camera 402, to an image signal processor (ISP) 414. The UE 401 may comprise multiple components that select a beam and/or a phase shift for a transmission from the UE, such as RF chips 408 and 410. Although only two RF chips are illustrated, the UE may include any number of components that select a beam and/or a phase shift for transmissions from the antennas of the UE. Use of at least some of the components of the UE 401 may affect camera performance. For example, FIG. 4A illustrates RF chip 408 causing radiated interference 403 to FPC 404 that carries data from camera 402 to the ISP 414. UE 401 includes multiple antenna panels 412a, 412b, 412c, 412d. Each antenna panel may include multiple antenna elements 416, as illustrated for antenna panels 412a and 412d. The number of antenna elements to enable the UE to communicate in different spatial directions may lead to placement of at least one antenna element in a location that may cause interference to a sensor or an interface of the UE. In one example, a UE may include more than 60 antenna elements. In order to place more than 60 antenna elements within the UE, some of the antenna elements may be positioned near a sensor or an interface. As well, the use of focused beams/focused radiation may cause additional interference to a particular sensor or interface. Therefore, use of some antenna panel(s), some antenna element(s), and/or some transceivers may cause internal interference to a sensor or interface of the UE. The example in FIG. 4A illustrates that antenna elements 416a and 416b may cause interference 407 to the camera 402 or MIPI line, e.g., that may comprise FPC 404.

Figure 4B:
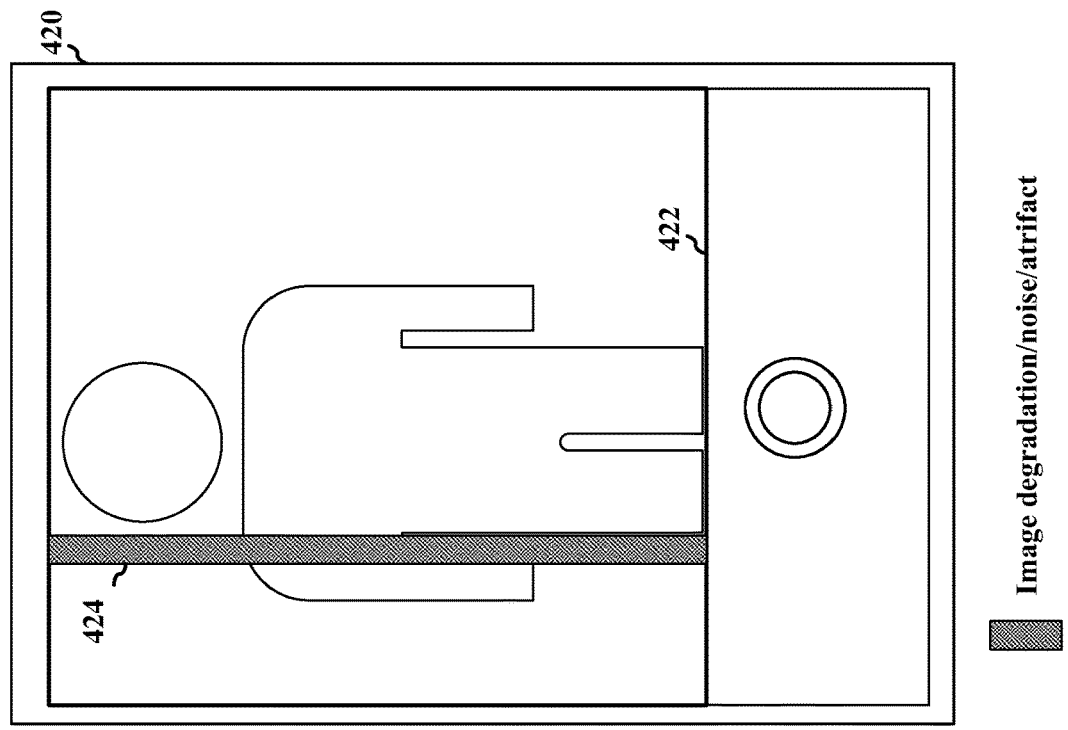
FIG. 4B illustrates an example of image degradation of a camera image due to internal interference of components of a UE in accordance with aspects presented herein.
Figure 4A:
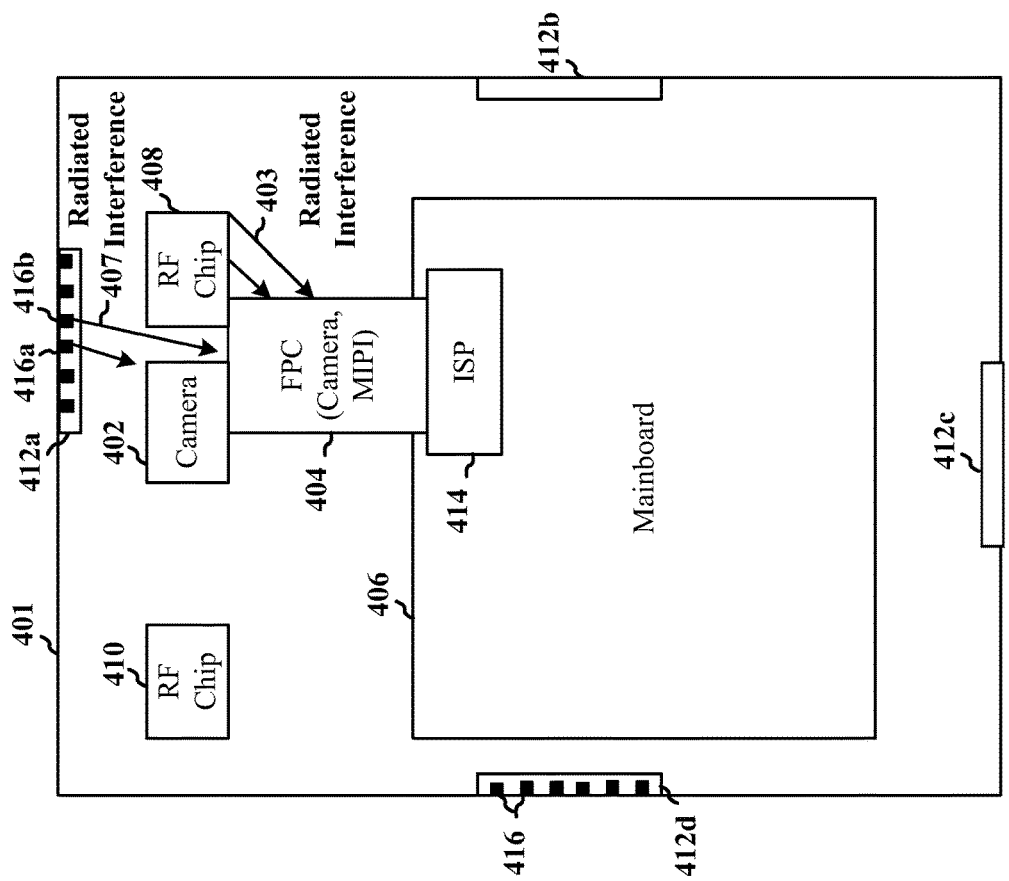
FIG. 4A is a diagram illustrating example of internal interference for components of a UE in accordance with aspects presented herein.

FIG. 4B illustrates an example showing a camera image 422 at a display of a UE 420 having an artifact 424 in the camera image 422 caused by internal interference from some antenna elements. The effects may be more pronounced for UEs comprising multiple camera components or having a pop-up camera. A pop-up camera may include a camera that physically rises or moves relative to a body of a UE in order to expose the camera or lens for taking pictures. The deterioration of the image may be increased at higher transmit powers used by the UE. The deterioration of the image may be increased when a narrower beam or a more focused radiation pattern is used by the UE.

In order to address the potential effect on a sensor or interface of the UE due to internal interference, the UE may determine when a sensor or interface is active, and in response may perform an action to limit performance impacts caused by the internal interference. In some examples, the UE may determine when a camera is active and may take an action to limit internal interference on the camera.

The example of reducing impacts on camera performance could apply in various situations. There may be multiple situations in which a camera and a modem of a UE would be concurrently active. For example, beamforming using certain beams may affect camera performance for videoconferencing using a camera for live video and antennas for streaming the live video using mmW. Camera performance may be affected for virtual reality (VR)/extended reality (XR) applications that use the camera and that communicate high speed data using beamformed transmissions, e.g., based on mmW or 5G NR. In another example, camera performance may be affected for drone applications using the camera for still images or video while connected to a 5G NR network or transmitting communication using beams. In another example, camera performance may be affected when recording video or taking pictures while using a data network, such as a 5G NR data network, a data network that uses beamforming, etc.

For mmW communication, a codebook may include information for a UE to use to communicate in a particular spatial direction with a base station. For example, the entries of the codebook may be associated with steering vectors, one for each beam, wherein each steering vector includes the phase shifts and/or signal scaling factors for each antenna element. The numbering of entries in the codebook may form a code to identify each beam. Entries of the codebook may be associated with single-directional or multi-directional beams, spreading lobes of transmitted signal energy towards more than one direction. Different entries of a codebook may include beams towards a same direction, but distinguish by a narrower or wider beam (e.g., by varying the width of a lobe). Thereby, a wider beam may use a reduced number of activated antenna elements. The codebook may include a set of transceivers and set of antenna elements that should be used for communication in one or more spatial directions. The codebook may indicate the direction(s) that the UE can form and for each beam, the set of transceivers and the set of antenna elements that should be activated to communicate using the particular spatial angle. In some examples, the codebook may include subsets of entries associated with beams pointing towards a same or a similar direction. For example, a subset may include a wider parent beam that e.g., use a limited set of transceivers and set of antenna elements, and further beams to refine the parent beam that use sets of antenna elements and transceivers that is larger or less limited than that of the parent beam to form narrower lobes or reduce the number of side lobes.

In some aspects, beam switching and/or codebook pruning may be used to avoid or prohibit the use of certain beams from the codebook. In some examples, beams in the codebook that use certain antenna elements, that may affect a sensor or an interface of the UE may be avoided or prohibited. As an example, beam switching and/or codebook pruning may be used to limit interference to a sensor or interface (e.g., a MIPI carrying camera data). By the beam switching, a different beam of the codebook may be selected to limit interference. By codebook pruning, codebook entries that may affect the sensor/interface are removed, avoided, or disabled. The codebook pruning or limitations on use of certain beams may be applied when a sensor and/or an interface associated with a camera is in use. When the sensor/interface is not in use, the limitations may be removed or the pruned beams may be restored.

Figure 5:
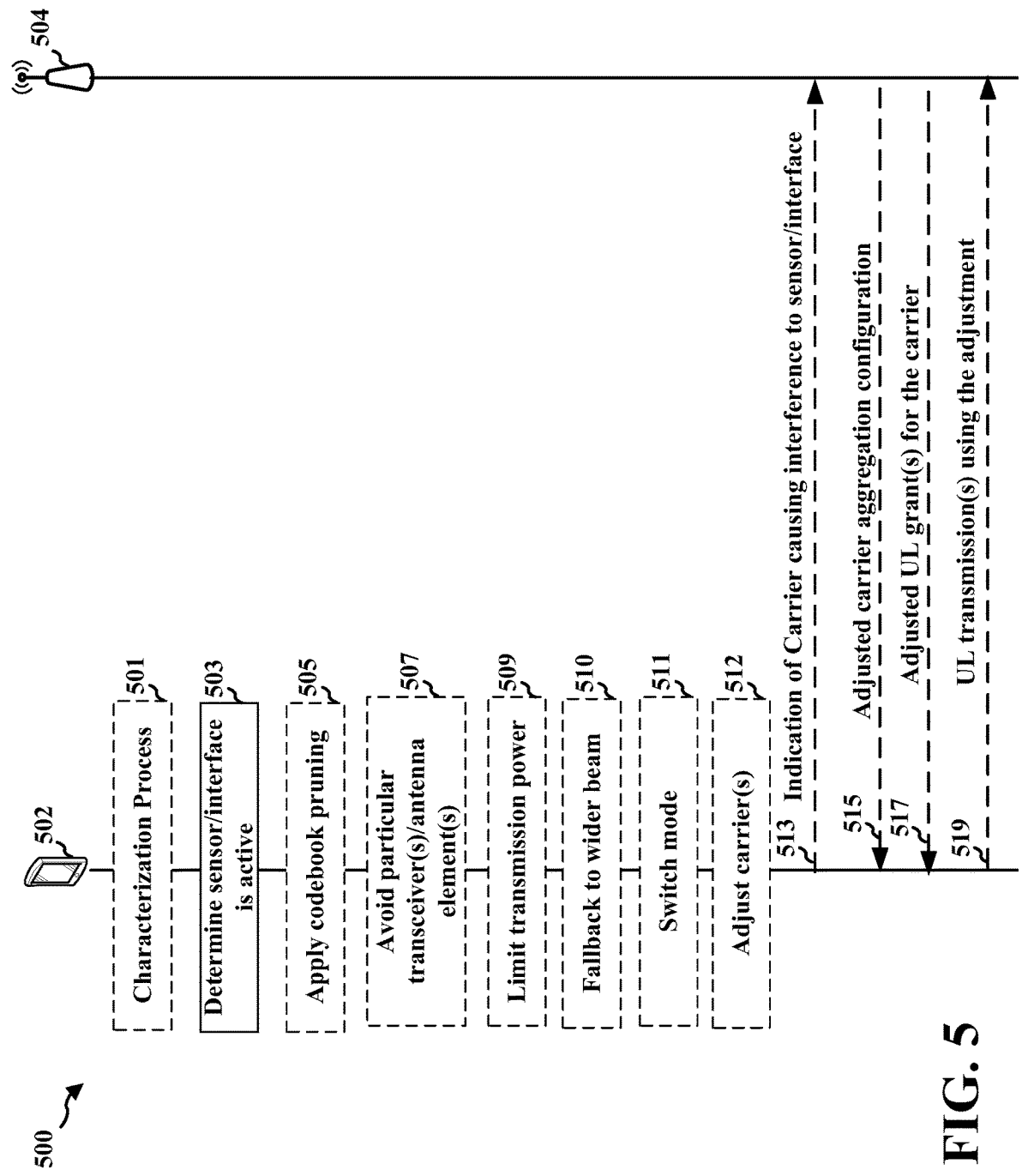
FIG. 5 is an example communication flow between a UE and a base station in accordance with aspects presented herein.

FIG. 5 illustrates an example communication flow 500 between a UE 502 and a base station 504 including aspects described in the present application. Optional aspects are illustrated with a dashed line. At 503, the UE may detect that a particular sensor or interface of the UE 502 is active, e.g., is being used. In response, at 505, the UE 502 may apply codebook pruning to remove codebook entries that may affect the sensor/interface.

The example of limiting internal interference to camera performance is merely to illustrate the concept of adjusting UE operation to avoid internal interference to a component of the UE 502. The aspects may be applied to internal interference that may be caused to other sensors or interfaces of the UE 502.

A codebook may include a field that identifies for each beam whether or not the beam impacts a particular sensor or interface of the UE 502. Antenna element design along with the radiation pattern and the classification, such as dipole or patch type, of the antennas may be used to identify beams that may have an effect on a particular sensor or interface of the UE. Based on a board design, e.g., proximity of the antenna array and components that control the antenna array to the sensor/interface, antenna elements may be identified that may cause glitches or noise to the sensor/interface and to degrade performance of the sensor/interface. For example, antenna elements may be identified that may cause interference to a camera MIPI line leading to degradation in camera performance.

In some examples, the UE 502 may perform a characterization process, as illustrated at 501, to determine beams that affect the sensor/interface. The UE may turn on the sensor or interface and perform a beam sweep procedure across the different beams that may be used by the UE. The UE may perform the beam sweep procedure using different transmit powers. The UE may determine interference caused to the sensor/interface for the different beams or for the different transmit power levels. The UE may then identify beams that have a threshold effect on the operation of the sensor/interface. For example, the UE may turn on a camera application and may determine an amount of image noise or image degradation that is caused by a set of potential beams. The UE may perform measurements for the beams using different amounts of transmit power. The UE may then identify beams or amounts of transmit power that cause a particular amount of noise to a camera image. The threshold may be a threshold that is stored at the UE.

As an example, the codebook may include a camera and/or sensor/interface impact field that indicates whether or not the beam impacts performance of the camera or other sensor/interface at the UE 502. The field may be in the form of a bitmask. The indication may comprise a true/false indication of whether or not the beam impacts the camera. For example, a "true" indication may be included for any beam that uses one or more antenna elements or phase shift components that impact the operation of the camera, e.g., that impact the camera MIPI line. The UE 502 may use this additional information in the codebook to determine which beams may cause noise and artifacts to the camera operation.

When the camera and/or sensor/interface is in use, the UE 502 may prune the codebook to avoid using beam(s) that are indicated as impacting the camera, as illustrated at 505. For example, a codebook manager (CBM) at the UE 502 may output a candidate beam list (CBL) that does not include the beams indicated in the codebook as having an effect on the sensor or the interface. When the use of sensor/interface is terminated (e.g. a camera application is closed), the pruned beams may be restored and a more comprehensive CBL may be used to select a beam for the UE 502.

Rather than just indicating in a true/false manner whether the beam impacts the sensor/interface, the codebook may indicate a power level at which the beam begins to impact the sensor/interface. For example, for a given beam in the codebook only a certain power level on that beam may be used while the sensor or interface is in use. The codebook may include, in addition to weights for phase shifters to create the beam, an indication of a power level that may be used for the beam in the case of use of the camera or other sensor/interface. In this example, the UE 502 can prune the codebook based not only on use of the sensor/interface but also based on a current transmission power for the UE 502 to avoid selecting a beam that would impact the sensor/interface at the current transmission power. Beams that do not impact the camera and/or sensor/interface at the current transmission power may be included in the CBL for the UE.

In another example, in addition or alternative to the above, a limitation other than a codebook field may be used to avoid use of antenna element(s), antenna panel, or beams that impact a particular sensor/interface of the UE 502 while the particular sensor/interface is being used. In this example, the UE 502 may avoid or exclude a set of one or more antenna element(s)/antenna panel/beam when the sensor/interface (e.g., camera) is being used, as illustrated at 507. For example, the UE 502 may only use antenna elements or antenna panels that are not prohibited when the sensor/interface is in use. The UE 502 may perform beam switching by querying alternate/neighbor beams for the current beam without using the prohibited antenna element(s)/antenna panel/beam. Such an approach may be applied without a change to the codebook. The UE 502 may limit use of the antenna element(s)/antenna panel/beam when the affected sensor/interface is being used and may select antenna element(s)/antenna panel/beam without limitation with the sensor/interface is not being used.

Rather than codebook pruning or avoiding selection of antenna element(s)/antenna panel/beam, when a particular sensor/interface is in use, the UE 502 may perform other adjustments when using a beam that impacts the sensor/interface. The UE may limit a transmission power (e.g., a maximum transmission power $TRP_{max}$) and/or effective isotropic radiated power ($EIRP_{max}$), such as illustrated at 509. The UE 502 may limit the maximum transmission power and/or effective isotropic radiated power below a level that causes an effect to the sensor/interface. For example, a power may be determined above which the radiated interference to a MIPI PHY line causes artifacts in camera images. When the camera is in use, the UE 502 may limit the transmission power (e.g., $TRP_{max}$ and/or $EIRP_{max}$) below the determined power level in order to avoid the internal interference to the MIPI PHY line. When the camera is not in use, the UE 502 may use a transmission power above the determined power level.

The UE 502 may fall back to a wider beam when the sensor/interface is being used and a beam, antenna element, and/or antenna panel is used that may affect performance of the sensor/interface, as illustrated at 510. For example, the UE may switch to a parent beam that is wider than a current beam that impacts the sensor/interface. The wider beam may limit the interference to the sensor/interface. For example, a wider beam may limit internal interference to a MIPI PHY line and may avoid causing artifacts in a camera image.

The UE 502 may switch to a different (e.g. from a first to a second) Radio Access Technology (RAT) when the sensor/interface is being used, as illustrated at 511. The switch may be based on the sensor/interface being used and a beam, antenna element, and/or antenna panel is used that may affect performance of the sensor/interface. For example, the UE 502 may change from operating using a mmW based RAT to operating using a Sub6 RAT or other RAT. In some examples, the UE 502 may switch a mode preference and fall back to a Sub6 RAT or a different RAT during camera operation. The switch may also be based on whether the second RAT to which the switch will be performed can satisfy the UE's wireless communication needs. Once the sensor/interface is no longer used, the UE may switch back to using the first RAT, e.g. the mmW based RAT or original RAT. In some examples, the UE may send an indication to a base station (such as base station 504) requesting or indicating that the UE may switch from a first RAT to a different second RAT. As an example, the request is sent in at least one of a UE assistance information message, an inter-device co-existence message, a radio resource control (RRC) message, or any other suitable message. In response, the base station initiates a corresponding inter-RAT handover, and sends a corresponding message to the UE. Upon receiving the message including the inter-RAT handover indication, the UE performs the indicated handover to the targeted second RAT (e.g., based on a pertinent handover protocol). The UE may furthermore inform the network when the sensor/interface is no longer used. To this end, the UE sends a corresponding message, using the second RAT to request or indicate that the UE may switch to the first RAT. In an example, the UE may indicate its capability to switch to the first RAT. In response, the base station may initiate an inter-RAT handover from the second RAT to the first RAT. The UE may receive a corresponding message causing the UE to perform the handover from the second to the first RAT (e.g., based on a pertinent handover protocol).

Wireless communication with a mmW carrier using particular beam(s) may also degrade performance of a sensor or an interface at the UE 502. The UE 502 may make adjustments to wireless communication using a particular carrier when the sensor/interface is being used, as illustrated at 512. For example, the UE 502 may drop a carrier when operating in carrier aggregation if the carrier may affect performance of a sensor/interface of the UE 502 and the sensor/interface is actively being used. The carrier may be identified or known to the UE 502 to impact performance of the sensor/interface. For example, the UE 502 may drop a mmW carrier that causes radiated interference to a MIPI PHY line when a camera is being used at the UE 502. While the camera is being used, the UE may use a different carrier, such as a sub6 carrier, an LTE carrier, and/or an alternate mmW carrier whose beam does not cause radiated interference to the MIPI PHY line, etc. Therefore, adjusting the carrier, at 512, may further include selecting a new carrier. The UE may send an additional notification to the network when the sensor/interface is no longer being used. The notification may inform the network that there are additional RATs, beams, or carriers available for use in communication with the UE.

The UE 502 may provide an indication 513 to the base station about a carrier for which the UE 502 is configured that is causing internal interference to a sensor or interface of the UE 502. As an example, the UE 502 may send the indication in a UE assistance information message, an inter device co-existence message, etc. The indication 513 from the UE 502 may indicate that the UE 502 seeks assistance from the network to assist in resolving the internal interference issue. The network, e.g., base station 504, may respond by adjusting a carrier configuration of the UE 502 to change from an indicated mmW carrier, to change a configured state of the indicated mmW carrier, or to reduce UL grants for the indicated mmW carrier. FIG. 5 illustrates the base station 504 sending an adjusted configuration 515 and adjusted uplink grant(s) 517 in response to the indication 513 from the UE 502. For example, the network may respond by not providing any additional uplink grants for the indicated mmW carrier, thereby muting transmissions that may impact the sensor/carrier. The network may respond by providing grants for discontinuous transmissions by the UE 502. The UE may send a notification to the network when the sensor/interface is no longer being used. The network may adjust the configured state of the carrier, may stop muting transmissions for the carrier, or may sends grants for transmissions that are not discontinuous in response to the notification from the UE that the sensor/interface is no longer being used.

As another example, rather than adjust/drop the carrier, the UE 502 may send an indication to the base station (e.g., in UE assistance information, or an Inter Device Co-existence (IDC) message) that may indicate a particular carrier.

The base station may respond by changing the carrier to a certain state or by refraining from providing uplink grants for the carrier, thereby muting the impact that transmissions on the particular carrier would have on the camera at the UE 502. The UE 502 may notify the base station when the carrier is available.

The UE 502 may transmit communication 519 to the base station 504 based on the adjustment applied at any of 505, 507, 5009, 510, 511, 512, 515, and/or 517.

Figure 6:
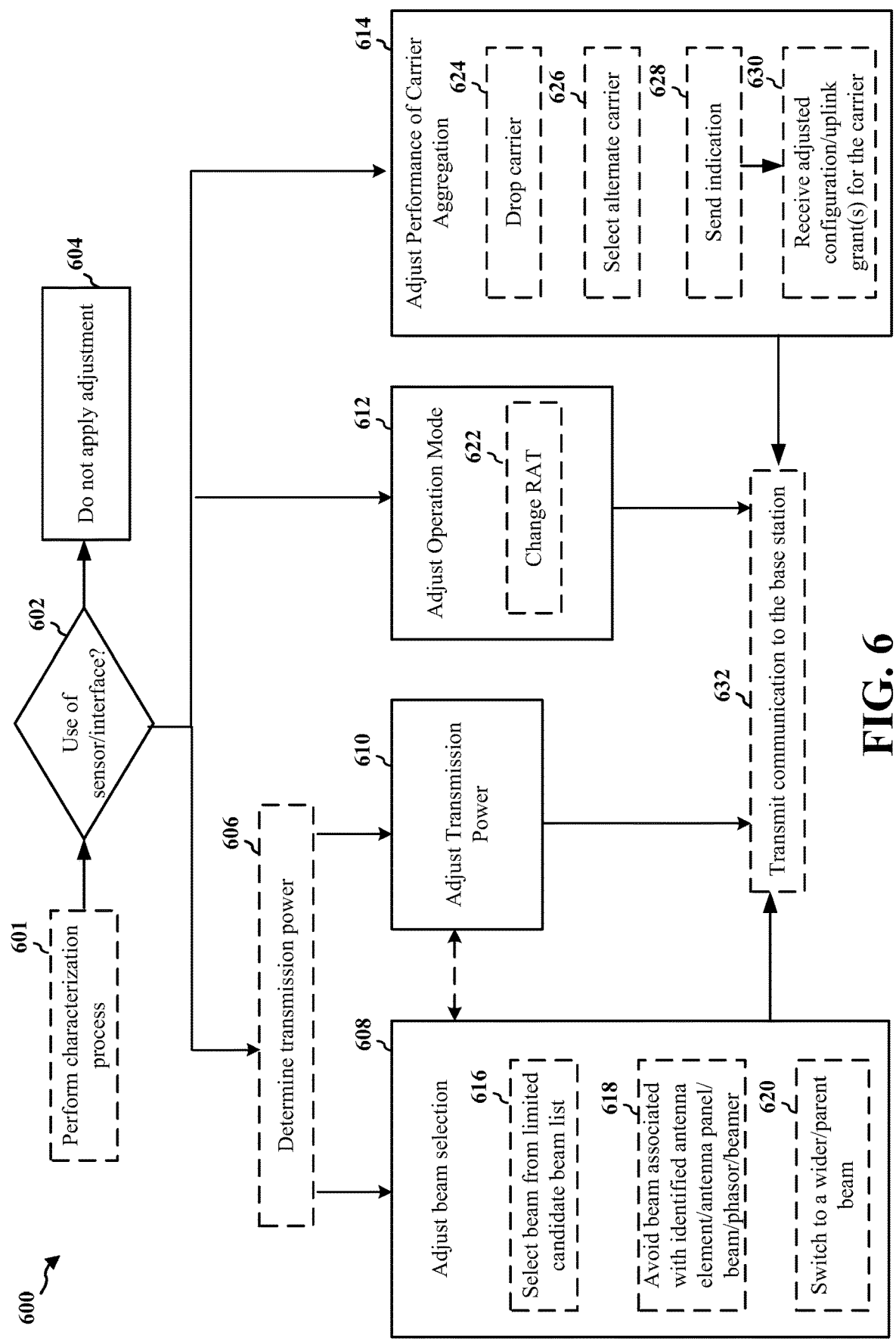
FIG. 6 is a flowchart of a method of wireless communication in accordance with aspects presented herein.

FIG. 6 is a flowchart 600 of a method of wireless communication. The method may be performed by a UE or a component of a UE (e.g., the UE 104, 350, 502, 1050; the apparatus 702/702'; the processing system 814, which may include the memory 360 and which may be the entire UE 350 or a component of the UE 350, such as the TX processor 368, the RX processor 356, and/or the controller/processor 359). The method may help to improve operation of a UE by making adjustments based on internal interference caused to a sensor and/or interface of the UE.

As illustrated at 601, the UE may perform a characterization process for the sensor or the interface in order to identify beams or transmission power levels that have an effect on a sensor or interface of the UE. The UE may turn on the sensor or the interface and perform a beam sweep procedure for a set of beams that may be used by the UE for communication. The UE may perform the beam sweep using different transmission power levels. The UE may measure an effect on performance of the sensor or interface and may identify one or more beams and/or a transmission power level that have an effect on the sensor or interface. The UE may use a threshold for the effect and may identify beams and/or transmission power levels that have the threshold effect on the performance of the sensor or interface. The UE may then exclude selection of the one or more beams or may limit the transmission power below the transmission power level when the sensor or interface is being used, e.g., in response to determining use of the sensor or interface.

At 602, the UE determines whether a particular sensor or interface is being used at the UE. If the UE does not determine that the sensor/interface is being used, at 604, the UE may continue with normal operation, without applying an adjustment or limitation. The sensor may comprise a camera, as described in connection with FIG. 4A. The interface may comprise a MIPI line carrying camera data from a camera sensor to an ISP, as described in connection with FIG. 4A. In other examples, the sensor may comprise a thermal sensor. The determination may be performed, e.g., by determination component 708 of the apparatus 702.

In response to determining the use of the sensor or the interface, the UE adjusts at least one of a beam selection, a transmission power, an operation mode, or a performance of carrier aggregation for the UE. The adjustment may be performed, e.g., by adjustment component 710 of the apparatus 702.

For example, at 608, the UE may adjust beam selection in response to determining the use of the sensor or the interface by limiting a candidate beam list to avoid beams indicated in a codebook as having an effect on the sensor or the interface. The adjustment may be performed, e.g., by beam selection component 718 of the apparatus 702. As illustrated at 616, the UE may select a beam based on the CBL. The CBL may have pruned entries based on a field that indicates whether the entry causes an effect (e.g., internal interference) to the sensor or interface that has been determined to be in use. The codebook may include a field for one or more beams indicating whether or not the one or more beams in the codebook has the effect on the sensor or the interface. In response to determining that the sensor or the interface is not in use, at 602, the UE does not limit the candidate beam list to avoid the beams indicated in the codebook as having the effect on the sensor or the interface, e.g., at 604. Thus, the UE utilizes a candidate beam list that does include beams indicated in the codebook as having the effect on the sensor or the interface.

The codebook may include a field for one or more beams indicating for the one or more beams in the codebook a power level at which the corresponding beam has the effect on the sensor or the interface. As illustrated at 606, the UE may determine a current transmission power of the UE, and the CBL may be limited based on the current transmission power. The determination of the transmission power may be performed, e.g., by transmission power component 722 of apparatus 702. For example, codebook entries may indicate a power at which an effect is caused to the sensor/interface. A codebook entry may be pruned from the CBL if the current transmission power is at or above the indicated power level for the codebook entry. If the current transmission power is below the indicated power level, the entry may be included in the CBL. As illustrated by the dashed line between 608 and 610, the UE may perform both adjustment of beam selection at 608 and adjustment of the transmission power at 610.

In an example in which the sensor comprises a camera or the interface comprises a MIPI line carrying camera data to an ISP, the effect on the sensor or the interface may include image degradation for a camera of the UE. The image degradation may be caused by radiated interference from at least one antenna element of the UE that interferes with a MIPI line carrying camera data from a camera sensor to the ISP.

As illustrated at 618, the UE may adjust beam selection in response to determining the use of the sensor or the interface by avoiding selection of beams associated with at least one of an antenna element, an antenna panel, or a beam that are identified as having an effect on the sensor or the interface. At 618, the UE may select a beam in a manner that avoids the beams associated with the at least one of the antenna element, the antenna panel, or the beam that are identified as having the effect on the sensor or the interface. The UE may select an alternate beam for a current beam, wherein the alternate beam is selected from a set of beams that does not include the beams associated with the at least one of the antenna element, the antenna panel, or the beam that are identified as having the effect on the sensor or the interface. As illustrated at 620, the UE adjusts the beam selection in response to determining the use of the sensor or the interface by switching to a wider beam or a parent beam of a current beam.

As illustrated at 610, the UE may adjust the transmission power of the UE based on determining the use of the sensor or the interface, at 602. The transmission power may be adjusted, e.g., by power component 712 of apparatus 702. The UE may adjust the transmission power when the sensor or the interface is used and when a beam is selected that has an effect on the sensor or the interface. A maximum transmission power or a maximum effective isotropic radiated power of the UE may be limited below a level at which the beam causes the effect on the sensor or the interface.

As illustrated at 612, the UE may adjust the operation mode of the UE in response to determining the use of the sensor or the interface. The operation mode may be adjusted, e.g., by mode component 714 of apparatus 702. For example, the UE may change from operation based on a RAT to operation based on a different RAT, as illustrated at

622. The first RAT may use beams, and the second RAT may communicate without using beamforming. As an example, the UE may switch from using mmW communication to using a sub6 RAT, an LTE RAT, etc.

As illustrated at 614, the UE may adjust the performance of carrier aggregation in response to determining the use of the sensor or the interface by adjusting communication on a carrier that is identified as having an effect on the sensor or the interface. The adjustment to the carrier aggregation may be performed, e.g., by carrier aggregation component 716 of apparatus 702. For example, at 624, the UE may drop a carrier that is identified as having an effect on the sensor or the interface. The UE may drop the carrier in an autonomous manner. The UE may adjust or reduce communication for the carrier. The UE may select an alternate carrier for carrier aggregation, at 626. The alternate carrier may be based on a different RAT than the carrier that is identified as having the effect on the sensor or the interface. The carrier may comprise a different mmW carrier that does not cause internal interference to the sensor/interface that is being used. As illustrated at 628, the UE may send an indication to a base station indicating that a carrier that the UE uses for the carrier aggregation has an effect on the sensor or the interface of the UE. The indication may be sent in at least one of a UE assistance information message or an inter-device co-existence message. At 630, the UE may receive an adjusted configuration for the carrier or reduced uplink grants for the carrier in response to the indication sent to the base station. The adjusted configuration may include a configuration for a different carrier. The reduced uplink grants may include no additional grants for the indicated carrier. The reduced uplink grants may include grants for discontinuous transmission on the indicated carrier.

As illustrated at 632, the UE may transmit communication to the base station based on the adjustment applied in connection with any of 608, 610, 612, and/or 614. The communication may be transmitted, e.g., by transmission component 706 of apparatus 702.

Figure 7:
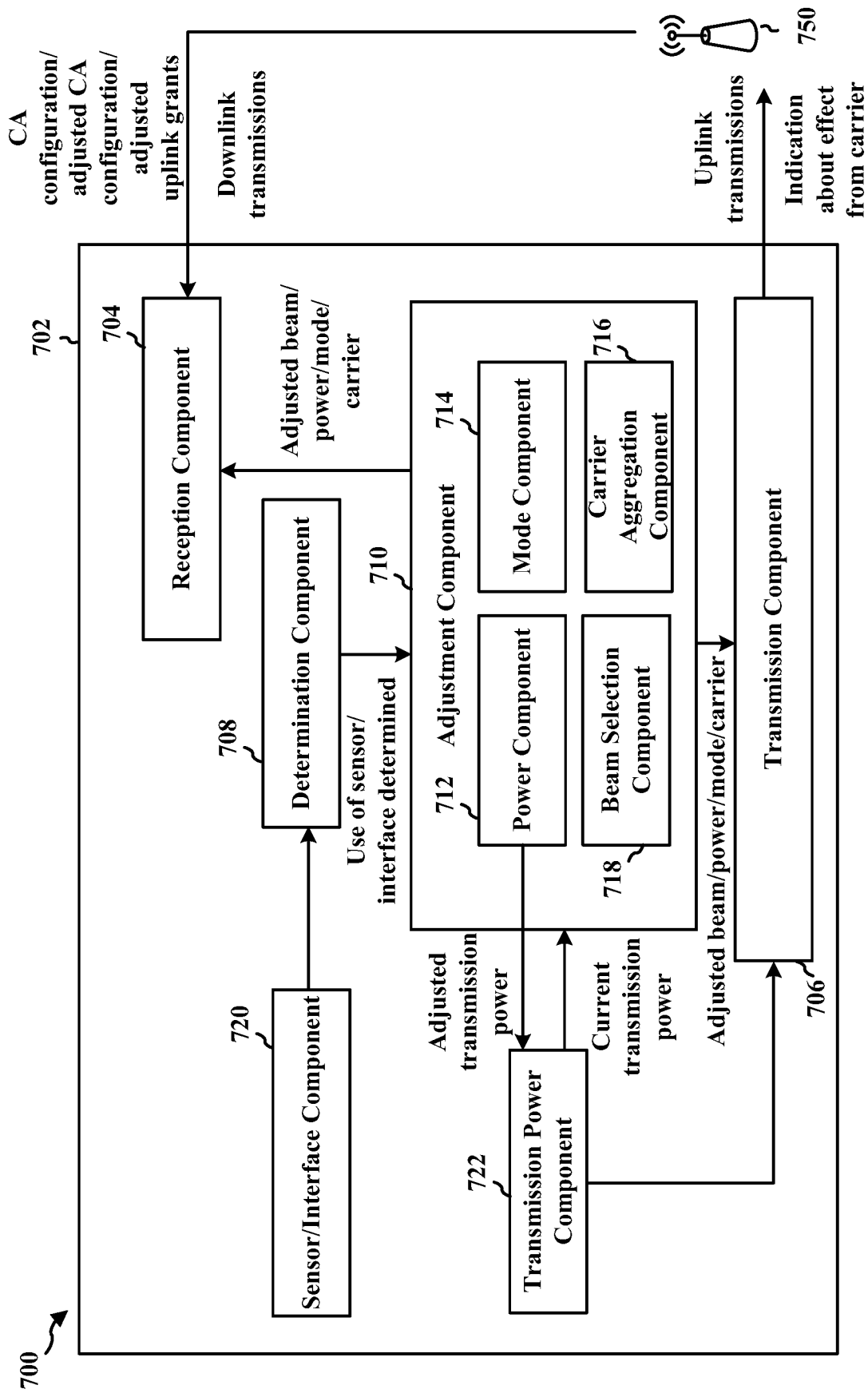
FIG. 7 is a conceptual data flow diagram illustrating the data flow between different means/components in an example apparatus in accordance with aspects presented herein.

FIG. 7 is a conceptual data flow diagram 700 illustrating the data flow between different means/components in an example apparatus 702. The apparatus 702 may be a UE or a component of a UE. The apparatus 702 includes a reception component 704 configured to receive downlink communication from the base station 750. The apparatus 702 includes a transmission component 706 configured to transmit uplink communication to the base station 750. The apparatus 702 may include a determination component 708 configured to determine use of a sensor or an interface of the UE, e.g., use of sensor/interface component 720. The apparatus 702 may include an adjustment component 710 configured to adjust, in response to determining the use of the sensor or the interface, at least one of a beam selection, a transmission power, an operation mode, or a performance of carrier aggregation for the UE. The adjustment component 710 may include a beam selection component 718 configured to adjust beam selection in response to determining the use of the sensor or the interface. The beam selection component 718 may limit a candidate beam list to avoid beams indicated in a codebook as having an effect on the sensor or the interface. The beam selection component 718 may avoid selection of beams associated with at least one of an antenna element, an antenna panel, or a beam that are identified as having an effect on the sensor or the interface. The beam selection component 718 may select an alternate beam for a current beam, wherein the alternate beam is selected from a set of beams that does not include the beams associated with the at least one of the antenna element, the antenna panel, or the beam that are identified as having the effect on the sensor or the interface. The beam selection component 718 may switch to a wider beam or a parent beam of a current beam. The adjustment component 710 may include a power component 712 configured to adjust the transmission power of the UE based on determining the use of the sensor or the interface. The adjustment component 710 may include a mode component 714 configured to adjust the operation mode of the UE in response to determining the use of the sensor or the interface by changing from operation based on a radio access technology (RAT) using beams to operation based on a different RAT. The apparatus may include a transmission power component 722 configured to determine a current transmission power of the UE. The adjustment component 710 may include a carrier aggregation component 716 configured to adjust the performance of carrier aggregation in response to determining the use of the sensor or the interface by adjusting communication on a carrier that is identified as having an effect on the sensor or the interface. The carrier aggregation component 716 may select an alternate carrier for the carrier aggregation, e.g., via transmission component 706. The carrier aggregation component 716 may send an indication to a base station indicating that a carrier that the UE uses for the carrier aggregation has an effect on the sensor or the interface of the UE and may receive an adjusted configuration for the carrier or reduced uplink grants for the carrier in response to the indication sent to the base station, e.g., via reception component 704.

The apparatus may include additional components that perform blocks of the algorithm in the aforementioned flowcharts of FIGS. 5 and 6. As such, blocks in the aforementioned flowcharts of FIGS. 5 and 6 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 8:
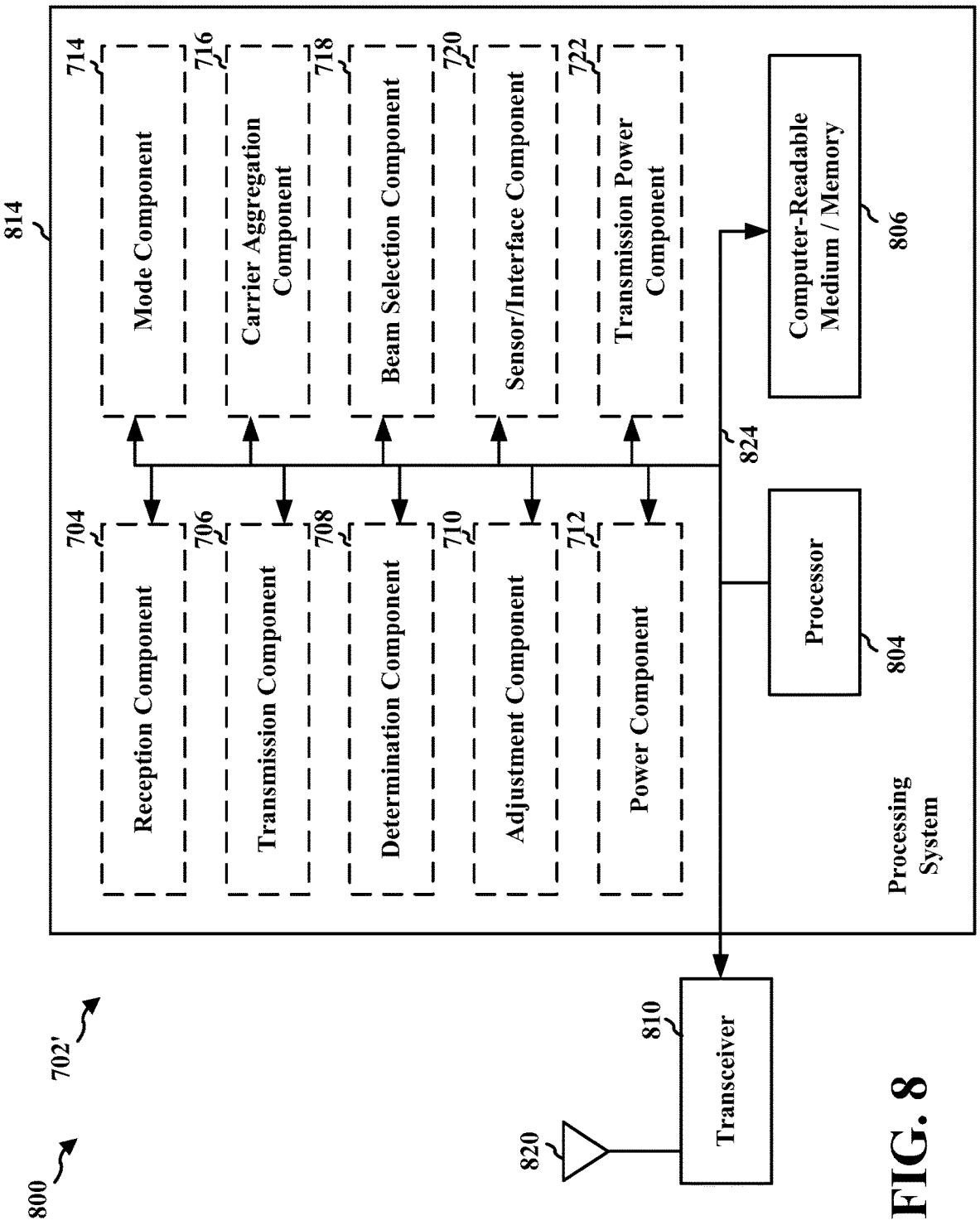
FIG. 8 is a diagram illustrating an example of a hardware implementation for an apparatus employing a processing system in accordance with aspects presented herein.

FIG. 8 is a diagram 800 illustrating an example of a hardware implementation for an apparatus 702' employing a processing system 814. The processing system 814 may be implemented with a bus architecture, represented generally by the bus 824. The bus 824 may include any number of interconnecting buses and bridges depending on the specific application of the processing system 814 and the overall design constraints. The bus 824 links together various circuits including one or more processors and/or hardware components, represented by the processor 804, the components 704, 706, 708, 710, 712, 714, 716, 718, 720, 722, and the computer-readable medium/memory 806. The bus 824 may also link various other circuits such as timing sources, peripherals, voltage regulators, and power management circuits, which are well known in the art, and therefore, will not be described any further.

The processing system 814 may be coupled to a transceiver 810. The transceiver 810 is coupled to one or more antennas 820. The transceiver 810 provides a means for communicating with various other apparatus over a transmission medium. The transceiver 810 receives a signal from the one or more antennas 820, extracts information from the received signal, and provides the extracted information to the processing system 814, specifically the reception component 704. In addition, the transceiver 810 receives information from the processing system 814, specifically the transmission component 706, and based on the received information, generates a signal to be applied to the one or more antennas 820. The processing system 814 includes a processor 804 coupled to a computer-readable medium/memory 806. The processor 804 is responsible for general processing, including the execution of software stored on the computer-readable medium/memory 806. The software, when executed by the processor 804, causes the processing system 814 to perform the various functions described supra for any particular apparatus. The computer-readable medium/memory 806 may also be used for storing data that is manipulated by the processor 804 when executing software. The processing system 814 further includes at least one of the components 704, 706, 708, 710, 712, 714, 716, 718, 720, 722. The components may be software components running in the processor 804, resident/stored in the computer readable medium/memory 806, one or more hardware components coupled to the processor 804, or some combination thereof. The processing system 814 may be a component of the UE 350 and may include the memory 360 and/or at least one of the TX processor 368, the RX processor 356, and the controller/processor 359. Alternatively, the processing system 814 may be the entire UE (e.g., see 350 of FIG. 3).

In one configuration, the apparatus 702/702' for wireless communication includes means for determining use of a sensor or an interface of the UE. The apparatus may include means for adjusting, in response to determining the use of the sensor or the interface, at least one of a beam selection, a transmission power, an operation mode, or a performance of carrier aggregation for the UE. The apparatus may include means for adjusting beam selection in response to determining the use of the sensor or the interface. The means for adjusting the beam selection may limit a candidate beam list to avoid beams indicated in a codebook as having an effect on the sensor or the interface. The means for adjusting the beam selection may avoid selection of beams associated with at least one of an antenna element, an antenna panel, or a beam that are identified as having an effect on the sensor or the interface. The means for adjusting the beam selection may select an alternate beam for a current beam, wherein the alternate beam is selected from a set of beams that does not include the beams associated with the at least one of the antenna element, the antenna panel, or the beam that are identified as having the effect on the sensor or the interface. The means for adjusting the beam selection may switch to a wider beam or a parent beam of a current beam. The apparatus may include means for determining a current transmission power of the UE. The apparatus may include means for adjusting the transmission power of the UE based on determining the use of the sensor or the interface. The apparatus may include means for adjusting the operation mode of the UE in response to determining the use of the sensor or the interface by changing from operation based on a radio access technology (RAT) using beams to operation based on a different RAT. The apparatus may include means for adjusting the performance of carrier aggregation in response to determining the use of the sensor or the interface by adjusting communication on a carrier that is identified as having an effect on the sensor or the interface. The means for adjusting the performance of carrier aggregation may select an alternate carrier for the carrier aggregation. The means for adjusting the performance of carrier aggregation may send an indication to a base station indicating that a carrier that the UE uses for the carrier aggregation has an effect on the sensor or the interface of the UE and may receive an adjusted configuration for the carrier or reduced uplink grants for the carrier in response to the indication sent to the base station. The aforementioned means may be one or more of the aforementioned components of the apparatus 702 and/or the processing system 814 of the apparatus 702' configured to perform the functions recited by the aforementioned means. As described supra, the processing system 814 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 9:
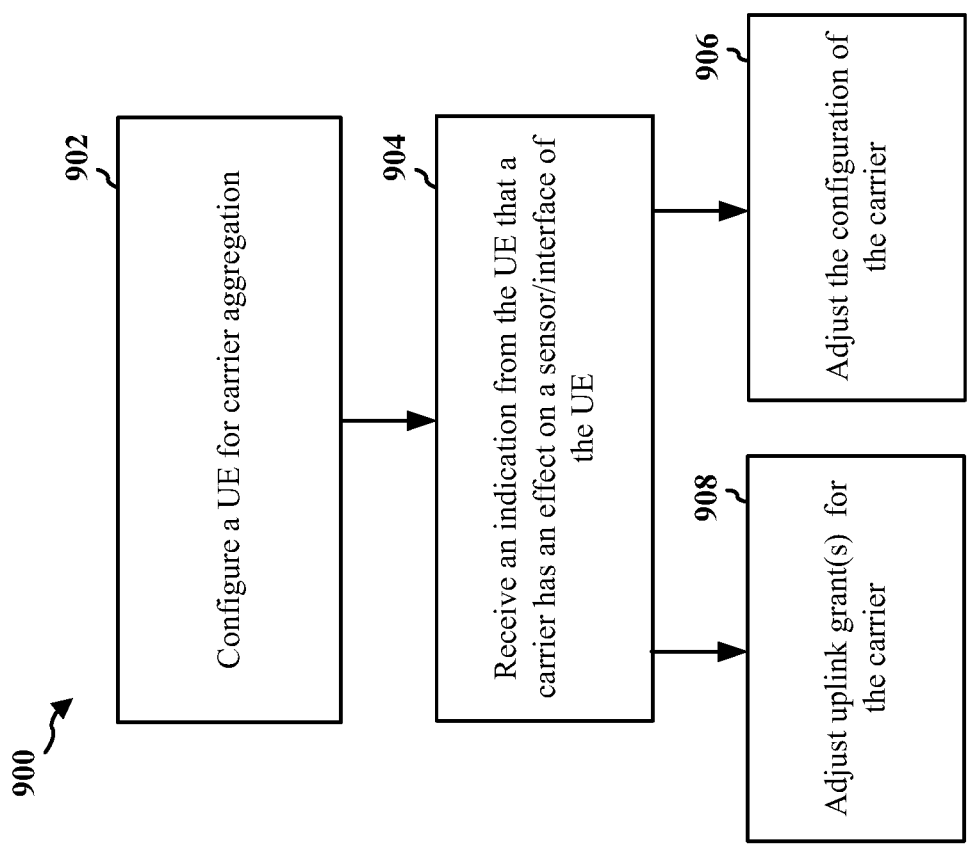
FIG. 9 is a flowchart of a method of wireless communication in accordance with aspects presented herein.

FIG. 9 is a flowchart 900 of a method of wireless communication. The method may be performed by a base station or a component of a base station (e.g., the base station 102, 180, 310, 504, 750; the apparatus 1002/1002'; the processing system 1114, which may include the memory 376 and which may be the entire base station 310 or a component of the base station 310, such as the TX processor 316, the RX processor 370, and/or the controller/processor 375). The method may help to improve operation of a UE by adjusting a configuration/grant(s) for carrier aggregation based on internal interference experienced at the UE.

At 902, the base station configures a UE for carrier aggregation. For example, carrier aggregation component 1008 of apparatus 1002 may configure the UE 1050 for carrier aggregation.

At 904, the base station receives an indication from the UE that a carrier for which the UE is configured has an effect on performance of a sensor or an interface of the UE. The indication may be received from the UE in a UE assistance information message. The indication may be received from the UE in an inter-device co-existence message. As described in connection with FIG. 4B, one of the carriers for which the UE is configured may cause a level of internal interference at the UE. The sensor may comprise a camera, for example. Communication using the carrier may cause image degradation for the camera. In another example, the interface may comprise a MIPI line, e.g., carrying camera data from a camera sensor to an ISP. The indication may be received, e.g., by indication component 1010 of apparatus 1002 via reception component 1004.

At 906, the base station may adjust a configuration of the carrier in response to receiving the indication from the UE. For example, the base station may change a configured state of the carrier in response to receiving the indication from the UE. For example, adjustment component 1012 of apparatus 1002 may perform the adjustment of the configuration of the carrier, or set the carrier (e.g. a secondary carrier, SCell) to a deactivated state.

Alternatively or additionally, at 908, the base station may adjust uplink grant(s) for the carrier in response to receiving the indication from the UE. For example, the base station may reduce uplink grants for the carrier in response to receiving the indication from the UE. For example, uplink grant component 1014 of apparatus 1002 may perform the adjustment of the uplink grant(s) for the carrier.

Figure 10:
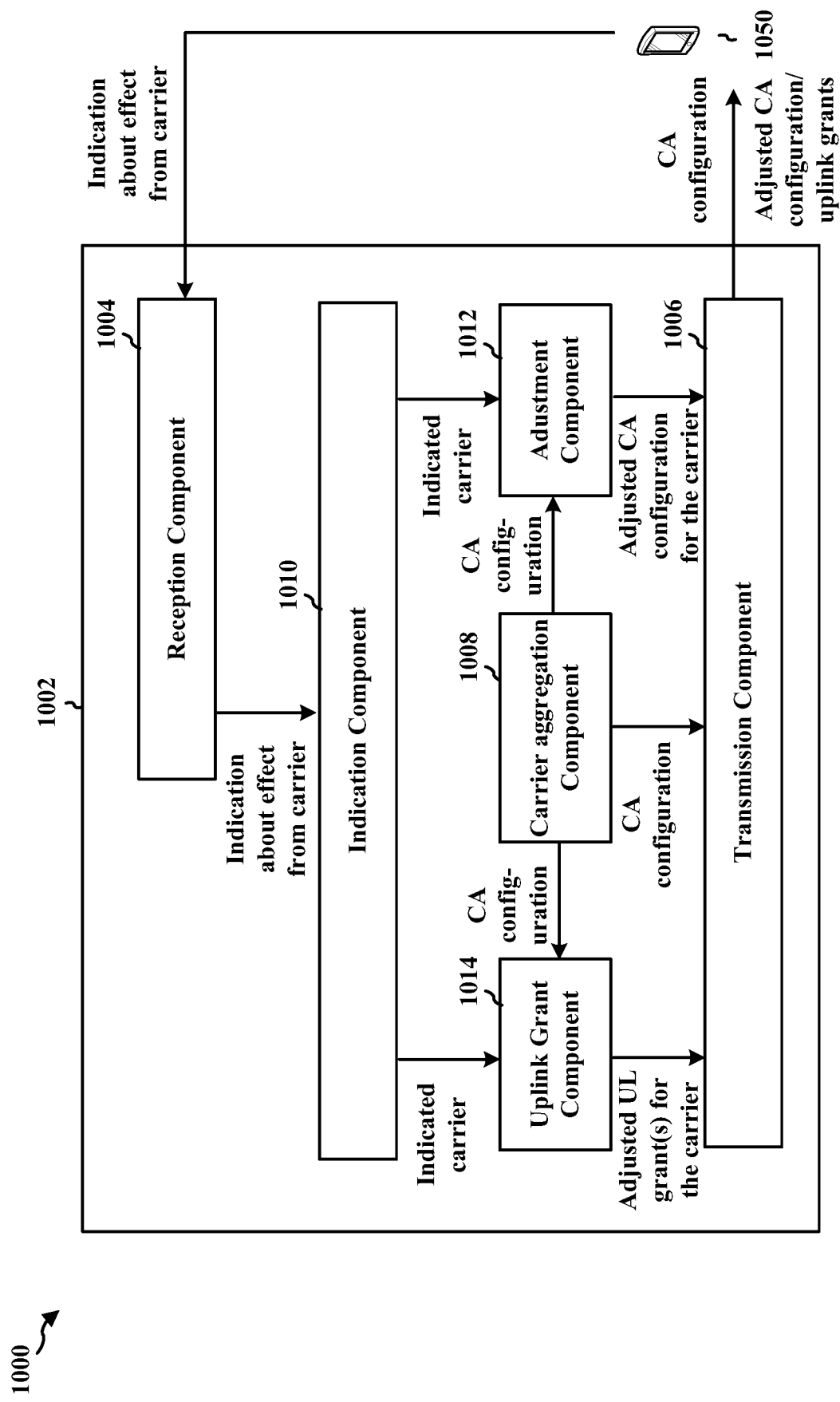
FIG. 10 is a conceptual data flow diagram illustrating the data flow between different means/components in an example apparatus in accordance with aspects presented herein.

FIG. 10 is a conceptual data flow diagram 1000 illustrating the data flow between different means/components in an example apparatus 1002. The apparatus may be a base station or a component of a base station. The apparatus 1002 may include a reception component 1004 configured to receive uplink transmissions from UE 1050. The apparatus 1002 may include a transmission component 1006 configured to transmit downlink communication to UE 1050. The apparatus 1002 may include a carrier aggregation component 1008 that configures the UE 1050 for carrier aggregation, e.g., as described in connection with 902 in FIG. 9. The apparatus 1002 may include an indication component 1010 configured to receive an indication from the UE 1050 that a carrier for which the UE 1050 is configured has an effect on performance of a sensor or an interface of the UE 1050, e.g., as described in connection with 904 in FIG. 9. The apparatus may include an adjustment component 1012 configured to adjust a configuration of the carrier in response to receiving the indication from the UE 1050, e.g., as described in connection with 906 in FIG. 9. The apparatus may include an uplink grant component 1014 configured to adjust uplink grant(s) for the carrier in response to receiving the indication from the UE 1050, e.g., as described in connection with 908 in FIG. 9.

The apparatus 1002 may include additional components that perform the blocks of the algorithm in the aforementioned flowcharts of FIGS. 5 and 9. As such, blocks in the aforementioned flowcharts of FIGS. 5 and 9 may be performed by a component and the apparatus 1002 may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 11:
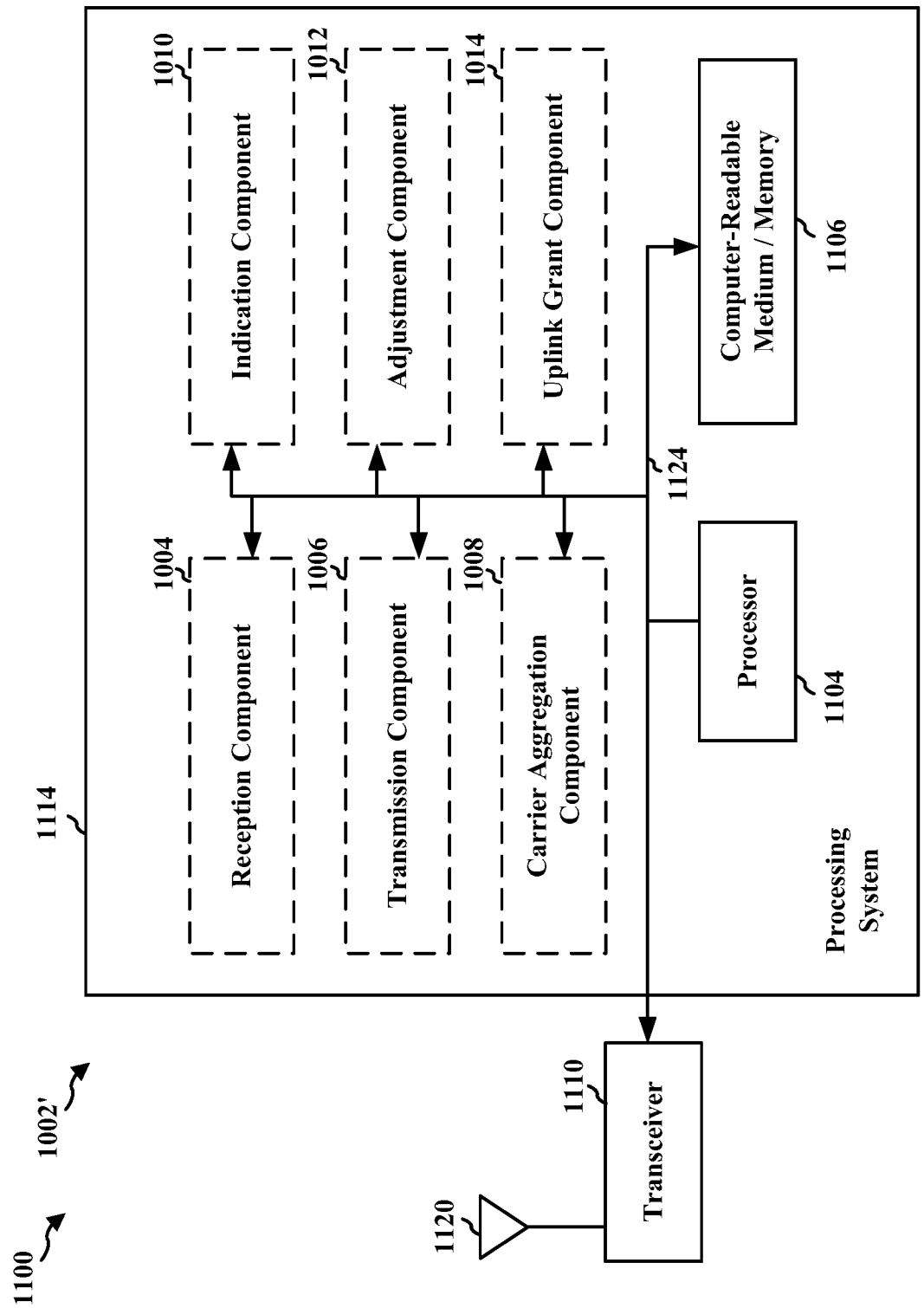
FIG. 11 is a diagram illustrating an example of a hardware implementation for an apparatus employing a processing system in accordance with aspects presented herein.

FIG. 11 is a diagram 1100 illustrating an example of a hardware implementation for an apparatus 1002' employing a processing system 1114. The apparatus 1002' may correspond to the apparatus 1002. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware components, represented by the processor 1104, the components 1004, 1006, 1008, 1010, 1012, 1014, and the computer-readable medium/memory 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114, specifically the reception component 1004. In addition, the transceiver 1110 receives information from the processing system 1114, specifically the transmission component 1006, and based on the received information, generates a signal to be applied to the one or more antennas 1120. The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system 1114 further includes at least one of the components 1004, 1006, 1008, 1010, 1012, 1014. The components may be software components running in the processor 1104, resident/stored in the computer readable medium/memory 1106, one or more hardware components coupled to the processor 1104, or some combination thereof. The processing system 1114 may be a component of the base station 310 and may include the memory 376 and/or at least one of the TX processor 316, the RX processor 370, and the controller/processor 375. Alternatively, the processing system 1114 may be the entire base station (e.g., see 310 of FIG. 3).

In one configuration, the apparatus 1002/1002' for wireless communication includes means for configuring a UE for carrier aggregation. The apparatus 1002/1002' may include means for receiving an indication from the UE that a carrier for which the UE is configured has an effect, e.g., causes internal interference on performance of a sensor or an interface of the UE. The apparatus 1202/1202' may include means for adjusting a configuration of the carrier or for adjusting uplink grant(s) for the carrier in response to receiving the indication from the UE. The means for adjusting may reduce the uplink grant(s) for the carrier in response to receiving the indication. The aforementioned means may be one or more of the aforementioned components of the apparatus 1002 and/or the processing system 1114 of the apparatus 1002' configured to perform the functions recited by the aforementioned means. As described supra, the processing system 1114 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

The following examples are illustrative only and aspects thereof may be combined with aspects of other embodiments or teaching described herein, without limitation. In the following, an overview of further examples of the present disclosure is provided:

Example 1 is a method of wireless communication at a user equipment (UE), comprising: determining use of a sensor or an interface of the UE; and in response to determining the use of the sensor or the interface, adjusting at least one of a beam selection, a transmission power, an operation mode, or a performance of carrier aggregation for the UE.

In Example 2, the method of Example 1 further includes that the sensor comprises a camera.

In Example 3, the method of Example 1 or Example 2 further includes that the interface comprises a Mobile Industry Processor Interface (MIPI) line carrying camera data from a camera sensor to an image signal processor (ISP).

In Example 4, the method of any of the previous examples, further includes that the UE adjusts the beam selection in response to determining the use of the sensor or the interface by utilizing a candidate beam list that does not include beams indicated in a codebook as having an effect on the sensor or the interface, the method further comprising: selecting a beam based on the candidate beam list.

In Example 5, the method of Example 4 further includes determining a current transmission power of the UE, wherein the candidate beam list is limited based on the current transmission power.

In Example 6, the method of any of the previous examples, further includes that the effect on the sensor or the interface comprises image degradation for a camera of the UE.

In Example 7, the method of Example 6, further includes that the image degradation is caused by radiated interference from at least one antenna element of the UE that interferes with a Mobile Industry Processor Interface (MIPI) line carrying camera data from a camera sensor to an image signal processor (ISP).

In Example 8, the method of Example 4, further includes that the codebook comprises a field for one or more beams indicating whether or not the one or more beams in the codebook has the effect on the sensor or the interface.

In Example 9, the method of Example 4, further includes that the codebook comprises a field for one or more beams indicating for the one or more beams in the codebook a power level at which a corresponding beam has the effect on the sensor or the interface.

In Example 10, the method of Example 4, further includes that in response to determining that the sensor or the interface is not in use, the UE utilizes a candidate beam list that includes the beams indicated in the codebook as having the effect on the sensor or the interface.

In Example 11, the method of any of the previous Examples, further includes that the UE adjusts the beam selection in response to determining the use of the sensor or the interface by excluding selection of beams associated with at least one of an antenna element, an antenna panel, or a beam that are identified as having an effect on the sensor or the interface, the method further comprising: selecting the beam by excluding the beams associated with the at least one of the antenna element, the antenna panel, or the beam that are identified as having the effect on the sensor or the interface from selection.

In Example 12, the method of Example 11, further includes that selecting the beam comprises selecting an alternate beam for a current beam, wherein the alternate beam is selected from a set of beams that does not include the beams associated with the at least one of the antenna element, the antenna panel, or the beam that are identified as having the effect on the sensor or the interface.

In Example 13, the method of any of the previous Examples, further includes that the UE adjusts the transmission power of the UE based on determining the use of the sensor or the interface.

In Example 14, the method of Example 13, further includes that the UE adjusts the transmission power when the sensor or the interface is used and a beam is selected that has an effect on the sensor or the interface.

In Example 15, the method of Example 14, further includes that a maximum transmission power or a maximum effective isotropic radiated power of the UE is limited below a level at which the beam causes the effect on the sensor or the interface.

In Example 16, the method of any of the previous Examples, further includes that the UE adjusts the beam selection in response to determining the use of the sensor or the interface by switching to a wider beam or a parent beam of a current beam.

In Example 17, the method of any of the previous Examples, further includes that the UE adjusts the operation mode of the UE in response to determining the use of the sensor or the interface by changing from operation based on a radio access technology (RAT) using beams to operation based on a different RAT.

In Example 18, the method of any of the previous Examples, further includes that the UE adjusts the performance of carrier aggregation in response to determining the use of the sensor or the interface by adjusting communication on a carrier that is identified as having an effect on the sensor or the interface.

In Example 19, the method of any of the previous Examples, further includes that the UE adjusts the performance of carrier aggregation in response to determining the use of the sensor or the interface by dropping a carrier that is identified as having an effect on the sensor or the interface.

In Example 20, the method of Example 19, further includes selecting an alternate carrier for the carrier aggregation.

In Example 21, the method of Example 20, further includes that the alternate carrier is based on a different radio access technology (RAT) than the carrier that is identified as having the effect on the sensor or the interface.

In Example 22, the method of any of the previous Examples, further includes that the UE adjusts the performance of carrier aggregation in response to determining the use of the sensor or the interface by sending an indication to a base station indicating that a carrier that the UE uses for the carrier aggregation has an effect on the sensor or the interface of the UE.

In Example 23, the method of Example 22, further includes that the indication is sent in at least one of a UE assistance information message or an inter-device co-existence message.

In Example 24, the method of Example 22 further includes receiving an adjusted configuration for the carrier or reduced uplink grants for the carrier in response to the indication sent to the base station.

In Example 25, the method of any of Examples 1-24 further include further performing a characterization process for the sensor or the interface that includes: turning on the sensor or the interface; performing a beam sweep procedure; and identifying one or more beams or a transmission power level having a threshold effect on the sensor or the interface, wherein the UE excludes selection of the one or more beams or limits the transmission power below the transmission power level in response to determining use of the sensor or the interface of the UE.

Example 26 includes a system or apparatus for wireless communication at a user equipment (UE), comprising: means for performing the steps of the method of any of examples 1-25. As an option, the means may comprise a memory and at least one processor coupled to the memory.

Example 27 includes an apparatus for wireless communication at a user equipment (UE), comprising one or more memories; and at least one processor coupled to the memory and configured to perform the steps of the method of any of examples 1-25.

Example 28 is a non-transitory computer-readable medium storing computer executable code for wireless communication at a user equipment (UE), the code when executed by one or more processors cause the processors to perform the method of any of examples 1-25.

Example 29 is a method of wireless communication at a base station, comprising: configuring a user equipment (UE) for carrier aggregation; receiving an indication from the UE that a carrier for which the UE is configured has an effect on performance of a sensor or an interface of the UE; and adjusting a configuration of the carrier or adjusting uplink grants for the carrier in response to receiving the indication from the UE.

In Example 30, the method of Example 29 further includes that sensor comprises a camera.

In Example 31, the method of Example 29 or Example 30 further includes that the interface comprises a Mobile Industry Processor Interface (MIPI) line carrying camera data from a camera sensor to an image signal processor (ISP).

In Example 32, the method of any of Examples 29-31 further includes that the indication is received in at least one of a UE assistance information message or an inter-device co-existence message.

In Example 33, the method of any of Examples 29-32 further includes that the base station changes a configured state of the carrier in response to receiving the indication from the UE.

In Example 34, the method of any of Examples 29-33 further includes that the base station reduces the uplink grants for the carrier in response to receiving the indication from the UE.

Example 35 is a system or apparatus for wireless communication at a base station, comprising: means for performing the steps of the method of any of examples 29-34. As an option, the means may comprise a memory and at least one processor coupled to the memory.

Example 36 is a device or apparatus for wireless communication at a base station, comprising: one or more memories; and at least one processor coupled to the memory and configured to perform the steps of the method of any of examples 29-34.

Example 37 is a non-transitory computer-readable medium storing computer executable code for wireless communication at a base station, the code when executed by one or more processors cause the processors to perform the method of any of examples 29-34.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a user equipment (UE), comprising:
    using a sensor or an interface of the UE; and
    adjusting, when the sensor or the interface is being used, a beam selection, for the wireless communication of the UE to reduce interference from the wireless communication of the UE to the sensor or the interface of the UE while the sensor or the interface is in use,
    wherein adjusting the beam selection includes selecting a beam based on at least one of:
        a candidate beam list that does not include beams indicated in a codebook as having an effect on the sensor or the interface, or
        exclusion of at least one beam associated with at least one of an antenna element, an antenna panel, or one or more beams that are identified as having the effect on the sensor or the interface.

2. The method of claim 1, wherein the sensor comprises a camera.

3. The method of claim 1, wherein the interface comprises a Mobile Industry Processor Interface (MIPI) line carrying camera data from a camera sensor to an image signal processor (ISP).

4. The method of claim 1, wherein the UE adjusts the beam selection based on the use of the sensor or the interface by selecting the beam utilizing the candidate beam list that does not include the beams indicated in the codebook as having the effect on the sensor or the interface.

5. The method of claim 4, wherein the candidate beam list is limited based on a current transmission power.

6. The method of claim 4, wherein the effect on the sensor or the interface comprises image degradation for a camera of the UE.

7. The method of claim 6, wherein the image degradation is caused by radiated interference from at least one antenna element of the UE that interferes with a Mobile Industry Processor Interface (MIPI) line carrying camera data from a camera sensor to an image signal processor (ISP).

8. The method of claim 4, wherein the codebook comprises a field for the one or more beams indicating whether or not the one or more beams in the codebook has the effect on the sensor or the interface.

9. The method of claim 4, wherein the codebook comprises a field for the one or more beams indicating for the one or more beams in the codebook a power level at which a corresponding beam has the effect on the sensor or the interface.

10. The method of claim 4, further comprising:
    utilizing, at a time that the sensor or the interface is not being used, a different candidate beam list that includes the beams indicated in the codebook as having the effect on the sensor or the interface.

11. The method of claim 1, wherein the UE adjusts the beam selection based on the use of the sensor or the interface by excluding selection of the at least one beam associated with the at least one of the antenna element, the antenna panel, or the one or more beams that are identified as having the effect on the sensor or the interface.

12. The method of claim 11, wherein selecting the beam comprises:
selecting an alternate beam for a current beam, wherein the alternate beam is selected from a set of beams that does not include the beams associated with the at least one of the antenna element, the antenna panel, or the beam that are identified as having the effect on the sensor or the interface.

13. The method of claim 1, wherein the UE adjusts a transmission power of the UE based on the use of the sensor or the interface.

14. The method of claim 13, wherein the UE adjusts the transmission power when the sensor or the interface is used and the beam is selected that has the effect on the sensor or the interface, wherein a maximum transmission power or a maximum effective isotropic radiated power of the UE is limited below a level at which the beam causes the effect on the sensor or the interface.

15. The method of claim 1, wherein the UE adjusts the beam selection based on the use of the sensor or the interface by switching to a wider beam or a parent beam of a current beam.

16. The method of claim 1, wherein the UE adjusts an operation mode of the UE based on the use of the sensor or the interface by changing from a first operation mode based on a radio access technology (RAT) using beam based communication to a second operation mode based on a different RAT.

17. The method of claim 1, further comprising performing a characterization process for the sensor or the interface that includes:
turning on the sensor or the interface;
performing a beam sweep procedure; and
identifying the one or more beams or a transmission power level having a threshold effect on the sensor or the interface,
wherein the UE excludes selection of the one or more beams or limits a transmission power below the transmission power level based on the use of the sensor or the interface of the UE.

18. An apparatus for wireless communication at a user equipment (UE), comprising:
memory; and
at least one processor coupled to the memory and configured to:
use a sensor or an interface of the UE; and
adjust, when the sensor or the interface is being used, a beam selection for the wireless communication of the UE to reduce interference from the wireless communication of the UE to the sensor or the interface of the UE while the sensor or the interface is in use,
wherein to adjust the beam selection, the at least one processor is configured to select a beam based on at least one of:
a candidate beam list that does not include beams indicated in a codebook as having an effect on the sensor or the interface, or
exclusion of at least one beam associated with at least one of an antenna element, an antenna panel, or one or more beams that are identified as having the effect on the sensor or the interface.

19. The apparatus of claim 18, wherein the sensor comprises a camera.

20. The apparatus of claim 18, wherein the interface comprises a Mobile Industry Processor Interface (MIPI) line carrying camera data from a camera sensor to an image signal processor (ISP).

21. The apparatus of claim 18, wherein the at least one processor is configured to adjust the beam selection based on the use of the sensor or the interface by utilizing the candidate beam list that does not include the beams indicated in the codebook as having the effect on the sensor or the interface.

22. The apparatus of claim 18, wherein the at least one processor is configured to exclude selection of the at least one beam associated with at least one of the antenna element, the antenna panel, or the one or more beams that are identified as having the effect on the sensor or the interface.

23. The apparatus of claim 18, wherein the at least one processor is configured to adjust a transmission power of the UE based on the use of the sensor or the interface.

24. The apparatus of claim 18, wherein the at least one processor is configured to adjust the beam selection based on the use of the sensor or the interface by switching to a wider beam or a parent beam of a current beam.

25. The apparatus of claim 18, wherein the at least one processor is configured to adjust an operation mode of the UE based on the use of the sensor or the interface by changing from a first operation mode based on a radio access technology (RAT) using beam based communication to a second operation mode based on a different RAT.

26. The apparatus of claim 18, wherein the at least one processor is configured to perform a characterization process for the sensor or the interface that includes:
turning on the sensor or the interface;
performing a beam sweep procedure; and
identifying the one or more beams or a transmission power level having a threshold effect on the sensor or the interface,
wherein the UE excludes selection of the one or more beams or limits a transmission power below the transmission power level based on the use of the sensor or the interface of the UE.

27. A method of wireless communication at a user equipment (UE), comprising:
using a sensor or an interface of the UE; and
adjusting, when the sensor or the interface is being used, a performance of carrier aggregation for the wireless communication of the UE to reduce interference from the wireless communication of the UE to the sensor or the interface of the UE while the sensor or the interface is in use,
wherein adjusting the performance of the carrier aggregation further includes one of:
adjusting communication on a carrier that is identified as having an effect on the sensor or the interface,
dropping the carrier that is identified as having the effect on the sensor or the interface, or
sending an indication to a base station indicating that the carrier aggregation has the effect on the sensor or the interface of the UE.

28. The method of claim 27, wherein the UE adjusts the performance of the carrier aggregation based on the use of the sensor or the interface by adjusting communication on the carrier that is identified as having the effect on the sensor or the interface.

29. The method of claim 27, wherein the UE adjusts the performance of the carrier aggregation based on the use of the sensor or the interface by dropping the carrier that is identified as having the effect on the sensor or the interface.

30. The method of claim 29, further comprising: selecting an alternate carrier for the carrier aggregation.

31. The method of claim 30, wherein the alternate carrier is based on a different radio access technology (RAT) than the carrier that is identified as having the effect on the sensor or the interface.

32. The method of claim 27, wherein the UE adjusts the performance of the carrier aggregation based on the use of the sensor or the interface by sending the indication indicating that one or more carrier that the UE uses for the carrier aggregation has the effect on the sensor or the interface of the UE.

33. The method of claim 32, wherein the indication is sent in at least one of a UE assistance information message or an inter-device co-existence message.

34. The method of claim 32, further comprising: receiving an adjusted configuration for the carrier or reduced uplink grants for the carrier in response to the indication sent to the base station.

35. The method of claim 27, wherein the sensor comprises a camera.

36. The method of claim 27, wherein the interface comprises a Mobile Industry Processor Interface (MIPI) line carrying camera data from a camera sensor to an image signal processor (ISP).

37. An apparatus for wireless communication at a user equipment (UE), comprising:
memory; and
at least one processor coupled to the memory and configured to:
use a sensor or an interface of the UE; and
adjust, when the sensor or the interface is being used, a performance of carrier aggregation for the wireless communication of the UE to reduce interference from the wireless communication of the UE to the sensor or the interface of the UE while the sensor or the interface is in use,
wherein to adjust the performance of the carrier aggregation, the at least one processor is configured to:
adjust communication on a carrier that is identified as having an effect on the sensor or the interface,
drop the carrier that is identified as having the effect on the sensor or the interface, or
send an indication to a base station indicating that the carrier for the carrier aggregation has the effect on the sensor or the interface of the UE.

38. The apparatus of claim 37, wherein to adjust the performance of the carrier aggregation based on the use of the sensor or the interface, the at least one processor is configured to adjust communication on the carrier that is identified as having the effect on the sensor or the interface.

39. The apparatus of claim 37, wherein to adjust the performance of the carrier aggregation based on the use of the sensor or the interface, the at least one processor is configured to adjust the carrier that is identified as having the effect on the sensor or the interface.

40. The apparatus of claim 37, wherein to adjust the performance of the carrier aggregation based on the use of the sensor or the interface, the at least one processor is configured to send the indication indicating that the carrier that the UE uses for the carrier aggregation has the effect on the sensor or the interface of the UE.

41. The apparatus of claim 37, wherein the sensor comprises a camera.

42. The apparatus of claim 37, wherein the interface comprises a Mobile Industry Processor Interface (MIPI) line carrying camera data from a camera sensor to an image signal processor (ISP).

* * * * *